(12) United States Patent
Steinbrecher (10) Patent No.: US 9,094,081 B1
(45) Date of Patent: Jul. 28, 2015

(54) METHOD FOR IMPROVING THE RANGE OF AN ELECTROMAGNETIC SIGNAL RECEIVING SYSTEM

(71) Applicant: Naval Undersea Warfare Center, Division, Newport, Newport, RI (US)

(72) Inventor: Donald H Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/340,637

(22) Filed: Jul. 25, 2014

(51) Int. Cl.
*H04B 1/10* (2006.01)
*H04B 1/12* (2006.01)

(52) U.S. Cl.
CPC ................................ *H04B 1/123* (2013.01)

(58) Field of Classification Search
USPC .......................................... 375/260; 455/260
See application file for complete search history.

(56) References Cited

U.S. PATENT DOCUMENTS

2013/0181725 A1* 7/2013 Mazzaro ...................... 324/636
2013/0337760 A1* 12/2013 Ko et al. ....................... 455/260

* cited by examiner

*Primary Examiner* — Eva Puente
(74) *Attorney, Agent, or Firm* — James M. Kasischke; Michael P. Stanley (57) ABSTRACT

A receiving system is provided in which an analog electromagnetic signal is received from a signal source. A digital observable signal generator and digital to analog convertor (DAC) produce an analog observable signal while a digital dither signal generator and DAC produce an analog dither signal. The electromagnetic signal, the observable signal and the dither signal continue to a power divider via an analog signal combiner. The divider provides identical signal paths wherein each signal path includes a signal frequency bandwidth of interest. The signal paths are amplified onto an analog to digital converter (ADC). The ADC is operable for a Nyquist frequency bandwidth, wherein the dither signal includes a pseudo-random electromagnetic signal with electromagnetic energy that falls outside the signal frequency bandwidth of interest but falls within the Nyquist frequency bandwidth. A processor processes signals from the signal paths to produce a digital image of the analog electromagnetic signal.

4 Claims, 4 Drawing Sheets

|   | 1 | 2 | 3 | 0 | 0 | 0 |
|---|---|---|---|---|---|---|
| 50 → | | $A_{EAX}$ | | | | |
| 52 ($A_{EAN}$) | | | | | | |
| | | | | | | |
| | | | | | | 50 ↓ |
| | | | | | 0 | P |

FIG. 4

METHOD FOR IMPROVING THE RANGE OF AN ELECTROMAGNETIC SIGNAL RECEIVING SYSTEM

STATEMENT OF GOVERNMENT INTEREST

The invention described herein may be manufactured and used by or for the Government of the United States of America for governmental purposes without the payment of any royalties thereon or therefore.

This application claims the benefit of U.S. Provisional Patent Application No. 61/985,085; filed on Apr. 28, 2014 by the inventor, Donald H. Steinbrecher and entitled "METHOD FOR IMPROVING THE RANGE OF AN ELECTROMAGNETIC SIGNAL RECEIVING SYSTEM".

CROSS REFERENCE TO OTHER PATENT APPLICATIONS

None.

BACKGROUND OF THE INVENTION (1) Field of the Invention

The present invention generally relates to electromagnetic signal acquisitions systems and specifically to optimizing a signal acquisition system that utilizes parallel processing channels.

(2) Description of the Prior Art

The electromagnetic signal receiving system described in U.S. Pat. No. 6,466,167, by the present inventor (Dr. Donald Steinbrecher) is incorporated herein by reference. The receiving system is a parallel processing system in which signal energy of a frequency band of analog electromagnetic signal space is divided equally among parallel channels. As a minimum, each parallel channel comprises an amplifier to lower system noise followed by an analog-to-digital converter (ADC) to create a digital image of the incident analog signal energy. The total signal energy is divided equally among the parallel channels so that each channel contains a portion of the energy from all signals in the frequency band of analog electromagnetic signal space.

The plurality of digitized channels is recombined in the digital signal processing domain to create a single digital image of the frequency band of analog signal space. It is stated in U.S. Pat. No. 6,466,167 that the minimum detectable signal (MDS) sensitivity is degraded by only a minor amount that is determined by the signal energy lost in the process of dividing the signal energy across a plurality of "p" identical signal channels.

It is further stated that the process of recombining the plurality of digital data streams in a digital signal processor can be accomplished without degrading the spurious-free dynamic range (SFDR) of the system. This is because the SFDR of a digital signal processor is directly related to the number of mantissa bits carried for each digital word in the processor. An empirical relationship between the SFDR and mantissa bits is that the SFDR increases approximately 5 dB for each mantissa bit. Thus, a digital signal processor (DSP) engine maintaining 32 mantissa bits would have a SFDR of at least 160 dB.

The programmable logic devices used for combining the plurality of digital signals and field programmable gate arrays (FPGA) allow the number of mantissa bits to be specified in the programmable logic. It follows that the digital combining process can be programmed to avoid degrading the SFDR regardless of how large a value of p is necessary to meet the mission SFDR requirement.

There are some items of concern with the above referenced art that were discovered as the system was operated. It was found that unexpected spurious responses that degraded overall performance were caused by imperfections in the ADCs used in the first p=12 system. It was concluded that such spurious responses could be expected in future systems emulating the same architecture.

The present invention addresses the above and other problems in a manner not shown in the prior art. Accordingly, those skilled in the art will appreciate the present invention.

SUMMARY OF THE INVENTION

It is therefore a primary object and general purpose of the present invention to provide improved software defined signal processing for electromagnetic signal acquisition systems.

It is another object of the present invention to provide an optimum number of 'p' channels for electromagnetic signal acquisition systems in which the processing system is referred to herein as a 'pChannel' radio, digital processor, acquisition system or the like, in light of an optimum SFDR performance.

It is a further object of the present invention to provide an improved spurious-free signal dynamic range useful in a variety of electromagnetic signal acquisition systems.

It is a still further object of the invention to provide a specific limit on the number of parallel processing channels required to achieve a mission-specific SFDR.

It is a still further object of the invention to provide a fundamental limit for an analog signal path minimum available gain, $G_A$, preceding an analog to digital converter in order to achieve a specified system noise figure, $F_{SYS}$.

In accordance with the present invention, an electromagnetic signal receiving system is disclosed. One embodiment of the invention comprises elements such as an electromagnetic signal source that provides an analog electromagnetic signal, a digital observable signal generator and an observable signal digital to analog convertor operable to produce an analog observable signal.

The invention further comprises a digital dither signal generator and a dither signal digital-to-analog converter operable to produce an analog dither signal. One possible preferred embodiment further comprises a power divider with p outputs wherein each of the outputs includes a signal frequency bandwidth of interest. The analog electromagnetic signal, the analog observable signal and the analog dither signal are operably connected to the power divider.

P identical signal paths lead from the power divider. Each of the p identical signal paths includes an amplifier and an analog to digital converter. The analog to digital converter comprises a Nyquist frequency bandwidth; wherein the dither signal includes a pseudo-random electromagnetic signal with electromagnetic energy that falls outside of the signal frequency bandwidth of interest but falls within the Nyquist frequency bandwidth.

The present invention further comprises a signal processor operable to process signals from the p identical signal paths to produce a digital image of the analog electromagnetic signal.

In one embodiment, the power divider may be implemented by utilizing an eplane with p epixels that produce the p outputs. By explanation, the present invention utilizes a partitioned aperture for electromagnetic energy capture. The partitioned aperture may comprise p individual partitions of equal area; each of which captures (1/p) of the total electromagnetic energy captured by the principal aperture. Following U.S. Pat. No. 7,420,522; the total aperture is referred to as an Eplane while each of the p equal area partitions is referred to as an Epixel. The system further comprises an analog signal combiner that combines the analog electromagnetic signal, the analog observable signal, and the analog dither signal.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged in order to facilitate an understanding of the invention.

DETAILED DESCRIPTION OF THE INVENTION

One purpose of the disclosed system is to provide software defined signal processing for a wide variety of electromagnetic signal acquisition systems and to improve the spurious-free signal dynamic range (SFDR) of such systems by parallel processing of multiple signal channels. The system disclosed herein improves upon the design and performance of the system described in U.S. Pat. No. 6,466,167. The figures herein discuss embodiments of the system in accordance with the present invention.

Figure 1:
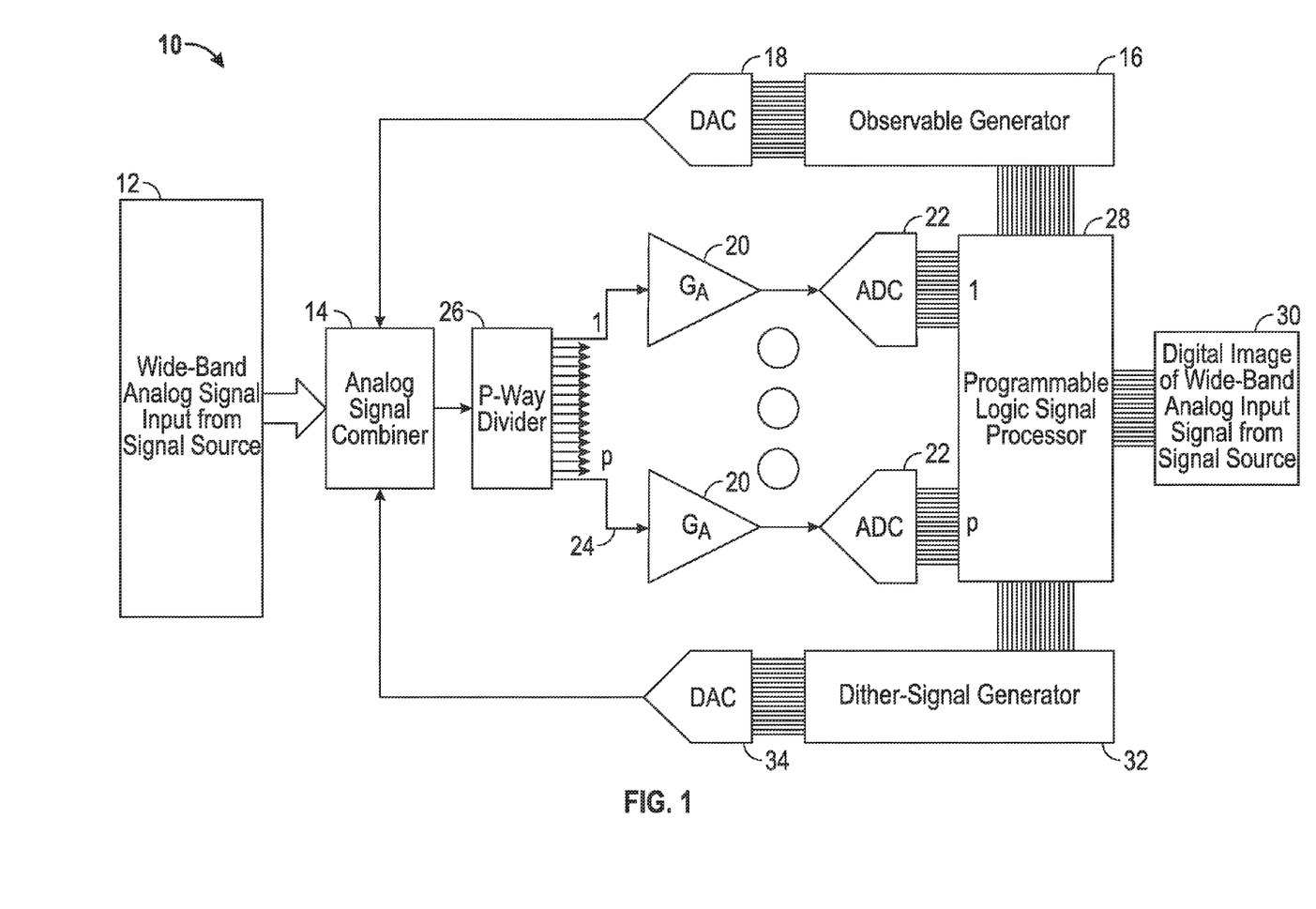
FIG. 1 is a diagram depicting a pChannel digital processor configuration for a wideband high dynamic range electromagnetic signal acquisition system in accordance with an embodiment of the invention.

In FIG. 1, a configuration for a non-limiting embodiment of a pChannel signal acquisition system 10 depicts the minimum components necessary to realize the benefits of the present system. In the figure, a wideband analog input signal 12 from a signal source (which could be an antenna or multiple antennas) is combined in an analog signal combiner 14 with two other locally-generated analog signal components, one of which includes an observable generator 16 and corresponding digital to analog converter (DAC) 18 that produces an analog observable signal. The signal combiner 14 outputs a combined analog signal.

In this application, the analog signal combiner 14 is defined from a class of RF components used for combining RF signals from different sources. One variety is the class called "directional couplers" which are used to insert a signal so that the signal travels in only one direction in the main signal path. The choice of signal combiner depends on the system design frequency of operation. The choice can be made by one ordinarily skilled in the art of RF system design.

The locally-generated analog signal components are a dither signal and an observable signal. "Locally-generated" refers to the architecture in FIG. 1. However, in some cases, signals of opportunity could be used for a dither generator and for the observable signal. Therefore, in many cases, locally-generated is not essential to the operation of the system.

In this application, an observable generator is any RF signal that can be observed as a component of the complex signal space in the digital domain. The principal function of the observable is to provide a time stamp for each signal packet generated in the digital domain. When the input RF signal space is partitioned into p channels and converted into p digital data streams; the timing of each data stream may be observed by reference to the observable so that the p channels can be properly aligned before recombining takes place. The result is that some latency is introduced in the process but the actual time of arrival of the signal is always derivable from the observable—which is injected as a system input before any appreciable delay is introduced. The observable may be derived from a GPS time stamp at the specific location of the system.

A power divider 26 divides the combined analog signal into p signals for p independent signal paths 24. Power dividers are common in RF systems and come in a variety of shape sizes and division ratios. The most common power dividers used in the pChannel architecture will be (power of 2) dividers such as 2, 4, 8, 16, 32 etc.

As a minimum, each of the p independent signal paths 24 comprises an amplifier 20 followed by an analog to digital converter (ADC) 22. Those skilled in the art will recognize that each signal path must also incorporate anti-aliasing features to ensure that all signal energy falls within a single Nyquist band of the ADC 22 in the signal path. Also, each of the p independent, but identical, signal paths 24 from the power divider 26 include frequency translators, filters, attenuators, and other analog signal processing components preceding the ADC as deemed essential to the mission requirements. Each ADC 22 is enabled by a clock signal that determines the sample rate of the ADC. The clock signal frequency may be the same or different in each of the signal paths—as determined by the intended application.

The observable generator 16 digitally synthesizes an analog sine wave by way of the digital to analog converter 18 at a frequency that is not in the signal band from the input signal 12 but is in the pass band of each of the p independent signal paths 24. The amplitude of the signal from the observable generator 16 in p independent signal paths 24 is mission dependent. The signal from the observable generator 16 passes through each of p independent signal paths 24 along with the signal from the input signal 12 and can be used by a programmable logic signal processor 28 to correct any differential phase errors that may exist in the signal paths 24.

The signal from the observable generator 16 can provide a method for time tagging the arrival of signals at the input signal 12. Using a known clock with one-second marks (for example: a GPS clock); the observable generator 16 creates an analog signal with identifiable one second marks that is added to the input wideband analog input signal 12 and passes through the p signal processing channels to the processor 28. The digital replica of the analog signal 12 in each of the p channels (signal paths 24) is compared with an original replica of the identifiable one-second marks in order to determine the individual time difference in each of the p channels. Using this information, the processor 28 can align the individual p channels (signal paths 24) before combining the channels to obtain a digital image 30 of the wideband analog signal 12 in which the digital image will contain the one-second marks. The digital image 30 is organized into data packets —according to user requirements. Each data packet is numbered in reference to the last data packet that contains a one second mark. This process is known as "time tagging".

Time tagging is accomplished by appending to each data packet, which contain one or more data samples, a counting number that is initialized at one second intervals. In order to accomplish this, the observable generator 16 is synchronized with a one second clock that may, in turn, be synchronized with a global positioning system time standard. The observable generator 16 uses this one second clock to insert a marker in the signal from the observable generator that will be detected (observed) and used to reset the counting number. For example, the observable generator 16 may flip the phase of the observable signal by 180 degrees. When this phase flip is detected by the signal processor 28; the counting number is initialized and each subsequent sample is counted and tagged. A small amount of residual fixed delay in the system is calibrated and is known to the mission.

A variable delay that is associated with the programmed processor 28 is the principal reason for incorporating time tagging in the system 10. However, time-tagging is critically important for correlating signals from one pChannel radio with those of other pChannel radios. Time-tagging can be accomplished if the time tag is synchronized to a GPS clock and the locations of the plurality of pChannel radios is known.

A dither signal generator 32 and a dither signal digital to analog converter (DAC) 34 create a pseudo-random analog signal that is added to the input signal 12 out of a signal band of the analog input signal but within the passband of the signal paths 24. "Dither", in the context of this application, is an intentionally applied form of noise used to randomize quantization errors when analog signals are digitized by the process of analog to digital conversion.

The function of the analog dither signal is to spread the energy of anomalies of the ADC 22 that are manifested as unwanted radio responses in the system 10. When the energy of these quantization anomalies is spread over the signal band; the anomalous energy comingles with the channel noise and becomes less of a mission concern. The relative power level of a dither signal in the independent signal paths is mission dependent.

The dither signal is derived by a digital algorithm so that the dither signal can be digitally removed from the digital image of the desired signal band in the signal processor 28. The algorithm is any step-by-step procedure for calculation that leads to a desired result. As used here, the dither signal is known and can be removed by a digital process even though the signal appears random when applied to the spreading of anomalous energy.

The power divider 26 will have loss that contributes directly to the system noise figure, $F_{SYS}$, but this loss can be very small and relatively insignificant because the dominant noise source in each signal path is from the ADC 22. Thus, in almost every case, a signal loss contribution of the power divider 26 to $F_{SYS}$ can be countered by a small increase in the gain of the low-noise amplifier 20 in each signal path. For this reason, it is assumed herein that the power divider 26 is lossless. Under this assumption, the signal power delivered to each signal path is (1/p) times the signal power delivered to the input of the power divider 26.

It is well known in the art that the noise figure of an amplifier is dependent on the impedance of the source driving the amplifier. Furthermore, it is well known from amplifier noise theory and the Rothe-Dahlke noise model used for amplifier noise analysis that a noise wave is launched backward out of the input port of an amplifier toward the source. The optimum source impedance, which is the source impedance that minimizes the amplifier noise figure, is the source impedance that exactly terminates the reverse traveling noise wave launched from the input of the amplifier. The use of a properly designed p-way power divider does not change this condition for optimum source impedance.

Assuming that the amplifiers 20 are identical in design and function; the reverse launched noise waves will be uncorrelated and so will add in power. Furthermore, within a properly designed power divider, those skilled in the art will incorporate internal terminations, which are designed to ensure that each of the p signal ports is isolated from all other signal ports (e.g., p–1, by more than 20 dB when all p output ports and the input port are properly terminated). This insures that the reverse-launched noise wave from one amplifier is isolated by more than 20 dB from the input ports of the other p–1 amplifiers. Thus, the p reverse-launched uncorrelated noise waves combine to create a reverse-launched noise wave at an input port of the power divider 26 that is equivalent in power magnitude to the reverse-launched noise wave from one of the amplifiers 20.

The equivalent noise figure of the pChannel signal acquisition system 10 will be minimized when this reverse-launched noise wave is properly terminated at the input port of the power divider 26. However, the optimum system source impedance must be determined by measurement for each pChannel system configuration in order to enhance the noise performance of the pChannel system 10. The noise impedance matching that minimizes the pChannel system noise figure, Fsys, is accomplished by tailoring the output impedance of the analog signal combiner 14. The signal is processed by the programmable logic signal processor 28, which provides an output system that produces the digital image 30 of the wide-band analog input signal 12.

Figure 2:
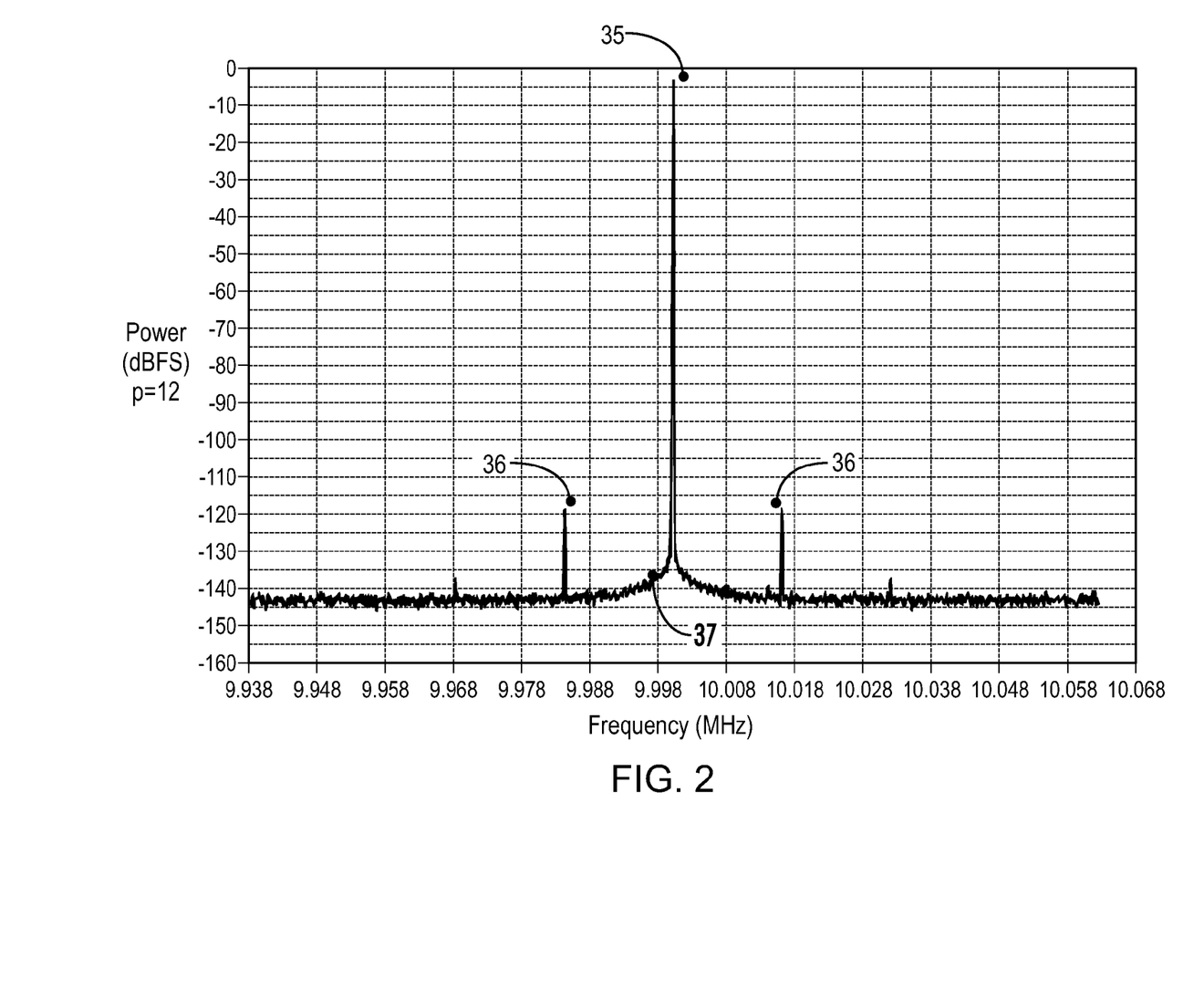
FIG. 2 is a graph depicting the digital output of a pChannel digital signals acquisition system in accordance with one embodiment of the invention.

In FIG. 2, an example is provided wherein the output digital signal of a p=12 pChannel radio with a single input signal is adjusted so that the ADCs 22 are operating near full scale. The figure depicts an illustration of the relevant signals. The purpose of this measurement is to determine the anomalies added to an input signal by the pChannel digitization process. Those skilled in the art will understand that a process known as "reciprocal mixing" can occur in the ADCs 22. Reciprocal mixing causes clock phase noise and clock spurious responses to be added to each analog signal processed by the ADC 22.

However, in order to observe these anomalies, it is necessary to use a signal source that contains no anomalies that are larger than those attributable to the reciprocal mixing process. An unmodulated test signal 35 with low phase noise is adjusted to a level approximately 2 dB below a full scale level of the ADC 22. The unmodulated test signal 35 is independently measured to determine the test signal phase noise levels and the test signal spurious levels. After conversion to a digital signal by the pChannel process; anomalous spurious responses 36 were observed and anomalous phase noise 37 was observed.

These anomalies were attributed to the clock signal source—later verified by independent measurement of the clock signal. The dominant system noise with a test signal present near full scale is –144 dBFS (–144 dB below full scale of the ADC 22) in a 3-KHz bandwidth, which establishes the system noise floor and minimum detectable signal for this p=12 pChannel system. The measurement results illustrated in FIG. 2 provides guidance in interpreting the pChannel performance illustrated by two-tone test results shown in FIG. 3.

Figure 3:
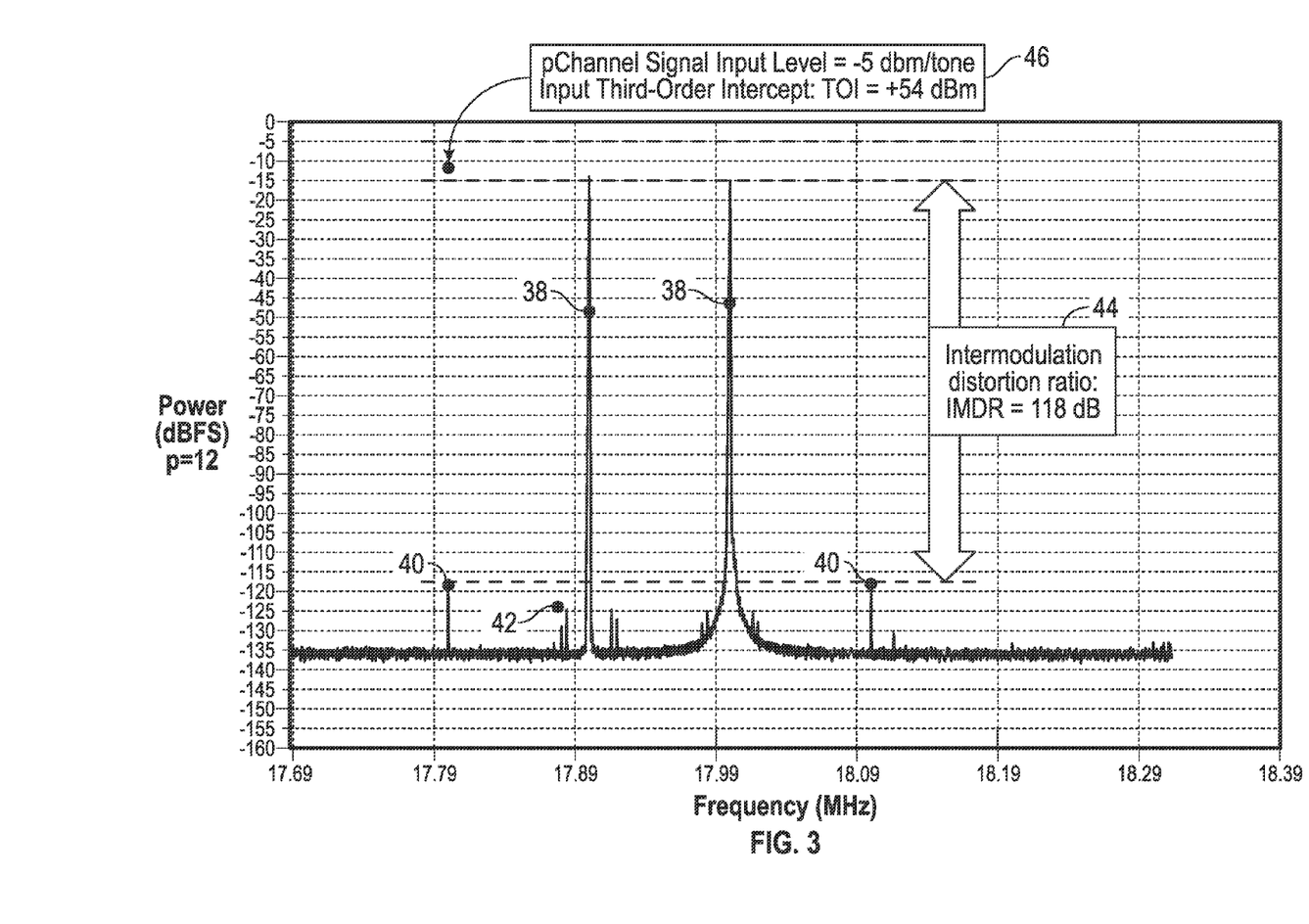
FIG. 3 is a graph showing the two-tone of a pChannel digital signal acquisition system in accordance with an embodiment of the invention.

FIG. 3 depicts the two-tone response of the pChannel digital signals acquisition system 10 in accordance with one embodiment of the invention. As shown in the example of the figure; the system noise floor has moved up to –135 dBFS, which is 9 dB higher than the noise floor observed in FIG. 2. The noise-floor increase is primarily caused by signal generator phase noise.

The test illustrated in FIG. 3 is known as a 'two-tone' test and is used to detect and characterize nonlinear properties of the pChannel system signal acquisition process. Of particular interest are third-order nonlinearities since these nonlinearities produce anomalies that cannot be filtered out of the signal band.

When two input test tones 38 are applied to the signal input 12; third-order distortion products or resultant tones 40 are also observed in the digital output data. The spurious responses 36 in FIG. 2 and clock spurs 42 in FIG. 3 (identified by the single tone test) appear on each of the two tones 38 in the two-tone test. The phase noise on each of the two tones 38 is greater than the phase noise on the single test tone in the single tone test. Furthermore, the phase noise on the higher frequency tone of the two tones in FIG. 3 is significantly greater than the phase noise on the lower frequency tone and also is responsible for the 9 dB increase in the pChannel system noise floor.

The third-order distortion products or two resultant tones 40 are produced by a process known as intermodulation distortion. The resultant tones 40 are caused by an undesirable third-order non-linearity in the pChannel transfer function and are used to characterize this non-linearity. Because the resultant tones 40 are caused by a third-order non linearity; their amplitude increases 3 dB for each 1 dB increase in the level of the input two-tone 38. It follows that there exists a hypothetical two-tone input level at which the two tones 38 and the resultant tones 40 will be at the same amplitude.

This hypothetical input level is called the 'Third Order Intercept' and is abbreviated as 'TOI' 46. For comparison purposes, the TOI 46 is evaluated at the system input and has dimensions of power. The primary use of the TOI 46 is to determine the expected level of distortion products at reasonable input levels and there is no expectation that the input level would ever reach the TOI.

The TOI 46 is evaluated by using the three-for-one rule. First, an intermodulation distortion ratio (IMDR) 44, using a detection bandwidth if 3 kHz, is measured in decibels and one half of this value is added to the two-tone 38 amplitude measured in decibels at the input port of the pChannel system, which for the case illustrated in FIG. 3, is −5 dBM. Thus, the p=12 pChannel system system input TOI=(118/2)+(−5)=+54 dBM in a 3 kHz bandwidth.

Figure 4:
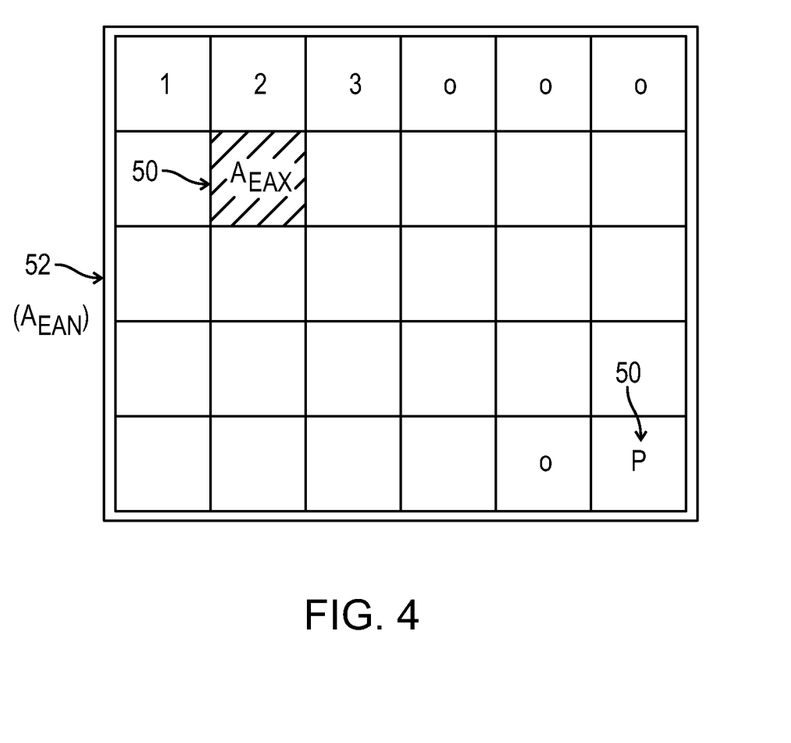
FIG. 4 is a diagram of a partitioned aperture in accordance with an embodiment of the invention.

A variation in the pChannel system signal processor architecture comprises replacing the power divider 26 with a partitioned aperture having p equal-aperture segments (as illustrated in FIG. 4). The partitioned aperture may be accomplished by the White Nail architecture as disclosed in U.S. Pat. No. 7,420,522 or with any other partitioned aperture comprising p-equal aperture segments. A White Nail air-interface partitioned aperture is described in several patents, including U.S. Pat. Nos. 7,420,522 and 7,250,920, which are incorporated herein by reference, and is discussed in more detail hereinafter, as a possible variation that inherently performs the function of the power divider 26.

In the partitioned aperture variation, the signal partitioning function is managed by controlling the size of the smallest partition, which in the case of a White Nail partitioned aperture is called an Epixel 50, so that the largest signal levels in the mission environment do not overload the ADCs 22 and so that the total aperture, Eplane 52, is large enough to capture a mission required minimum detectable signal. These conditions are satisfied when Equations 1 and 2, discussed hereinafter, are satisfied.

Accordingly, the present invention provides a procedure for optimizing the design of a pChannel radio by determining a fundamental limit on the number of parallel channels required to achieve a specified SFDR. The minimum number of channels has been designated as 'p' and the processing system has been given the name 'pChannel'.

In one embodiment, energy associated with some spurious responses can be spread over a wide frequency range by adding out-of-band random energy to an input signal path of the ADC 22. Spreading spurious energy by this method reduces the effects of the spurious energy. The effect of the added random signal, which is added into the signal path, is described as whitening the spurious energy and the quantization noise of the ADCs 22 so that the energy density is uniformly spread across the frequency band of interest.

The added random signal, which is sometimes referred to herein as a 'dither signal' comprises a pseudo-random radio frequency signal that is generated and filtered by the digital signal generator 32 so that the electromagnetic energy falls outside of the band of electromagnetic signals of interest but falls within the Nyquist band of the ADCs 22 in each signal path 24. For example, if the ADC 22 sample rate is 100 Mega-samples/second; then the Nyquist band is 50 MHz wide. If the signal band is less than 50 MHz; then the dither signal would be inserted in a portion of the 50 MHz band that does not contain signal energy. It follows that the ADC sampling rate must be greater than twice the signal bandwidth in order to make room in the Nyquist frequency band for the dither signal. The purpose of this added dither signal is to randomize the sampling process of the ADC 22 for signals of interest. The dither signal is removed by filtering in the digital signal processing steps of the signal processor 28 that follow the process of the ADC 22.

Another embodiment is the development of fundamental performance limits that include a fundamental limit for the analog signal path minimum available gain, $G_A$, preceding the ADC 22 in order to achieve a specified system noise figure, $F_{SYS}$. The system noise figure determines the minimum detectable signal (MDS) when the MDS bandwidth is known.

A fundamental limit is determined on the complexity factor, p, which determines the minimum number of parallel channels necessary to achieve a specified system signal dynamic range. Per the present invention, the minimum available gain required to achieve a specified system noise figure is:

$$G_A \geq \left[\frac{2}{3} 2^{-2N} \frac{P_{FSAO}}{kT_0 f_N}\right] \frac{1}{F_{SYS} - 1} \quad (1)$$

in which $F_{SYS}$ is the specified system noise figure. The remaining factors in Equation 1, those contained within the brackets, all relate to the properties of the ADC 22 in the signal path. The factors are:

N=the number of quantization bits in the ADC 22, $P_{FSAO}$=the available signal power of a sine wave at the output of a source feeding into the input of the ADC 22 that just reaches full scale of the ADC quantizer, and $f_N$=the Nyquist bandwidth of the ADC 22, which is also ½ of the sample rate of the ADC.

The remaining two factors are physical constants and are left within the brackets so that the bracketed factor is dimensionless. The factors are:

k=the Boltzmann constant, $1.38 \times 10^{-23}$ Joule/Kelvin, and $T_0$=standard temperature, 290 Kelvin.

The pChannel electromagnetic signal receiving system 10 is configured as p parallel channels (signal paths 24), each comprising a minimum of the amplifier 20 with available power gain $G_A$ followed by the ADC 22 that creates a digital image of the analog signals in the signal path. The input signal 12 is divided equally among the p channels by the power divider 26 while the p digital images are combined in the processor 28 in order to recover the digital image of analog input signal 12.

In accordance with the present invention, a minimum acceptable value of p can be determined by the peak signal energy to be processed by the acquisition system 10, which then sets the fundamental limit on a signal power dynamic range of the input signal 12.

The available gain, GA, of the amplifier 20 can be determined by the MDS specification and can be calculated by Equation 1. The maximum input signal, $P_{MAX}$, is also amplified by $G_A$ the same as the MDS and cannot exceed the full-scale power of the ADC 22 without destroying the integrity of the signal path 24. The fundamental limit on the minimum value for the complexity factor, p, is given by:

$$p \geq G_A \frac{P_{MAX}}{P_{FSAO}} \quad (2)$$

in which $G_A$ is determined by Equation 1. The assumptions (under which Equations 1 and 2 were derived) ensure that the results specify fundamental limits for the pChannel receiver configuration. Thus, in light of the present invention, it is believed that it will not possible to find another configuration that can achieve the same or greater signal dynamic range with fewer equivalent ADCs. To this end, the pChannel acquisition system 10 provides an optimal design that is based on the mission signal dynamic range requirement.

As referred to above, two variations of the pChannel design are also provided herein. In this invention and in one variation, the focus is on the pChannel signal acquisition system 10 with high spurious free dynamic range comprising the signal paths 24. A single input port is partitioned by the power divider 26 into p parallel equal amplitude channels each of which at least feeds a signal path 24 with the amplifier 20 having an available gain $G_A$ followed by the ADC 22 that creates a digital image of the analog electromagnetic signals in the signal path 24.

The instantaneous bandwidth of the signal path 24 is less than the Nyquist bandwidth of the ADC 22 at least by an amount that allows a random dither signal to be inserted outside of the signal band but within the Nyquist bandwidth in order to whiten some spurious signals and quantization errors generated by the ADC process. The resulting p digital channels (signal paths 24) are combined in the signal processor 28 to create the digital image 30 of the analog input signal 12. In summary, the pChannel acquisition system 10 has a single wide-band analog signal input port 12 and a single digital output port and produces a digital image 30 of the analog signal 12 at the input port.

A second variation is based on the "White Nail" air interface as described in U.S. Pat. No. 7,420,522, incorporated herein by reference. The White Nail interface inherently performs or implements the function of the power divider in the basic pChannel variation. Accordingly, the White Nail air interface effectively comprises a power divider as the term is used herein.

The White Nail air interface comprises a large effective aperture, $A_{EAN}$, called an Eplane 52, which is partitioned in checkerboard fashion into p small equal-area partitions called Epixels 50, each of which has an effective aperture of $A_{EAX}=A_{EAN}/p$. In this variation, the fundamental limit on the signal channel gain (as specified by Equation 1) is still valid.

However, the fundamental complexity limit as expressed by p in Equation 2 is interpreted as the number of Epixel partitions in the White Nail Eplane. If it is assumed that a mission requirement specifies that the largest electromagnetic component of the signal energy incident on the Eplane 52 has a power density of $W_{XIS}$ Watts/meter$^2$ then $P_{MAX}$ in Equation 2 should be interpreted as $P_{MAX}=A_{EAN}\times W_{XIS}$. This is counter-intuitive because $P_{MAX}$ is seen to represent the total large signal power summed across all Epixels 50 in the Eplane 52 and the magnitude of $P_{MAX}$ is only evident after all Epixel signals are combined in the signal processor 28 into a single digital image.

Accordingly, the Epixel signals from the Eplane are then processed by utilizing p signal paths as described herein. The Eplane may comprise a plurality of antenna elements with each antenna element providing an Epixel signal.

Detailed descriptions of the preferred embodiment are provided herein. It is to be understood, however, that the present invention may be embodied in various forms. In particular, any partitioned aperture that has the same properties as the White Nail aperture may perform the same poer dividing function as the White Nail aperture. Therefore, specific details disclosed herein are not to be interpreted as limiting, but rather as a basis for the claims and as a representative basis for teaching one skilled in the art to employ the present invention in virtually any appropriately detailed system, structure or manner.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An electromagnetic signal receiving system comprising:
   a digital observable signal generator and an observable signal digital-to-analog converter operable to produce an analog observable signal;
   a digital dither signal generator and a dither signal digital to analog converter operable to produce an analog dither signal;
   an analog signal combiner capable of receiving an analog electromagnetic signal, the analog observable signal and the analog dither signal;
   a power divider operable to receive an output of said signal combiner, said power divider operable to produce p signal paths wherein p is an integer and greater than one and wherein each of the p signal paths comprises a signal frequency bandwidth of interest, the analog electromagnetic signal and the analog observable signal and the analog dither signal;
   an amplifier and an analog to digital converter, said analog to digital converters operable with a Nyquist frequency bandwidth, wherein the dither signal comprises a pseudo-random electromagnetic signal with electromagnetic energy that falls outside of the signal frequency bandwidth of interest but falls within the Nyquist frequency bandwidth; and
   a signal processor operable to process signals from the p signal paths to produce a digital image of the analog electromagnetic signal.

2. The system of claim 1, wherein a gain $G_A$ of said amplifier in each of the p signal paths is calculated by $$G_A \geq \left[\frac{2}{3} 2^{-2N} \frac{P_{FSAO}}{kT_0 f_N}\right] \frac{1}{F_{SYS} - 1}$$

wherein $F_{SYS}$ is a specified system noise figure, N=a number of quantization bits in said analog to digital converter in each of the signal paths, $P_{FSAO}$=an available signal power of a sine wave of said amplifier that reaches full scale of said analog to digital converter with the dither signal present, $f_N$=the Nyquist frequency bandwidth, k=the Boltzmann constant, $1.38 \times 10^{-23}$ Joule/Kelvin, and $T_0$=standard temperature, 290 Kelvin.

3. The system of claim 2, wherein a minimum value for p is determined from $$p \geq G_A \frac{P_{MAX}}{p_{FSAO}}$$

where $P_{MAX}$ is a maximum input power to said analog to digital converter.

4. The system of claim 3, wherein a sampling rate of said analog to digital converter is greater than twice the signal frequency bandwidth of interest.

\* \* \* \* \*